Oct. 6, 1931.  H. HULL  1,825,868
PROPELLER
Filed July 18, 1929
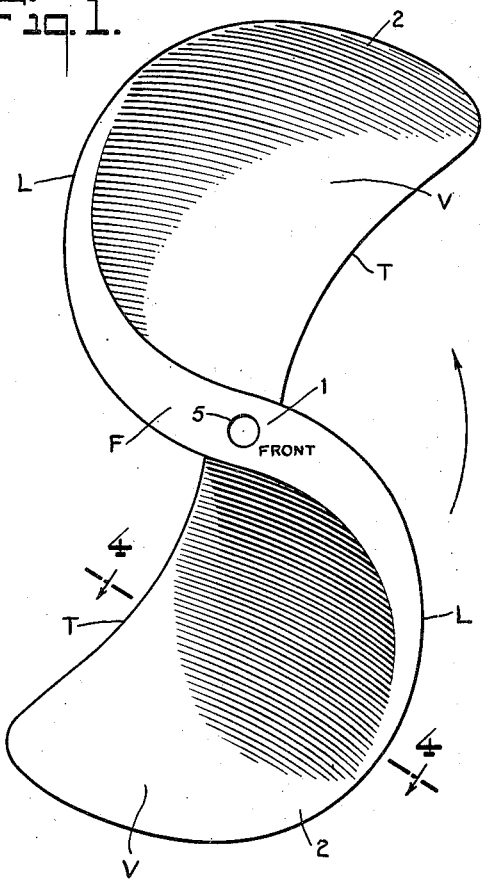
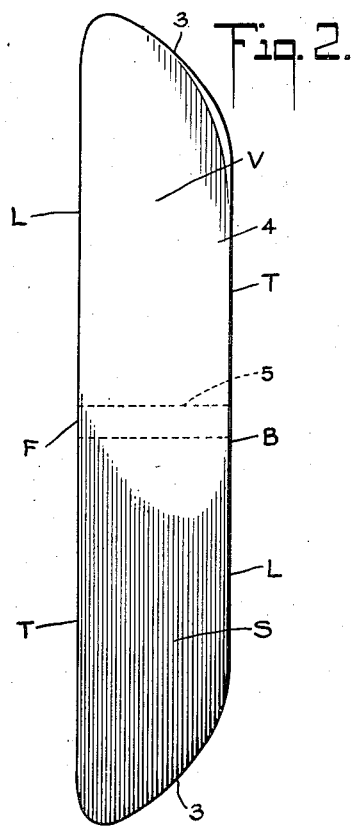
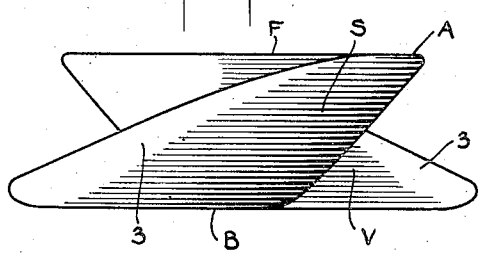
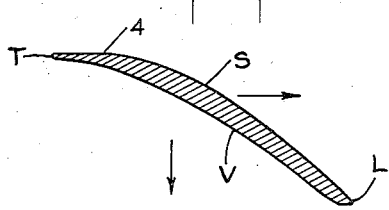
INVENTOR
Horace Hull
BY
Cavanagh + James
ATTORNEYS Patented Oct. 6, 1931

1,825,868

UNITED STATES PATENT OFFICE

HORACE HULL, OF DENVER, COLORADO

PROPELLER

Application filed July 18, 1929. Serial No. 379,090.

This invention relates to devices which are adapted to translate rotary motion into rectilinear motion when operated in a suitable fluid medium, and more particularly to that class known as screw propellers.

Such a propeller may be used to move the fluid medium in which it rotates while its plane of rotation remains stationary. Such a use is exemplified in fans and pumps wherein the propeller is adapted to rotate in a stationary plane and the fluid, either gas or liquid, is caused to move.

Or, such a propeller may be used to move the body to which it is attached through the fluid medium. Such examples are its use to propel an aircraft through the air or a ship through water.

I have seen fit to describe and illustrate my invention as incorporated in an air screw or aircraft propeller, adapted to rotate in air to cause a longitudinal thrust through its center of rotation, which may be used to create substantially horizontal motion for an airplane or airship. The size and proportion of such propeller must vary with its speed of rotation, speed of the craft upon which it is mounted, and the load it is expected to sustain. But I wish it to be understood that such changes can be made without departing from the spirit of this invention.

I wish it to be further understood that the necessary changes in proportion, size and shape to utilize this invention in fans, pumps and marine propellers is contemplated to be within the scope of this invention.

It is the object of this invention to produce a propeller of such proportions and curvature as to maintain a maximum vacuum on the vacuum side thereof.

With the above recited objects and others of a similar nature in view, my invention consists in the construction, combination and arrangement of parts set forth in and falling within the scope of the appended claims.

In the accompanying drawings—

Fig. 1 is a front view of an air screw or air propeller;
Fig. 2 is a side view of the same propeller,
Fig. 3 is an end view; and
Fig. 4 is a section taken through 4—4 of Fig. 1.

Fig. 1 shows a propeller adapted to be used as a tractor screw for aircrafts of that type known as a right-hand propeller when it is mounted on the front of the aircraft and adapted to be rotated in the direction of the arrow. The figure illustrates the view an observer would have who stood in front of an airplane when such a screw is mounted in front of the motor in the usual fashion as a tractor right-hand propeller. L designates the leading edge of the blades, and T the trailing edge. F designates the front of the propeller when mounted as described above, and B designates the back or side near the motor or cockpit in a tractor machine. As the propeller is rotated in the direction indicated by the arrow in Fig. 1 it will create a zone of low pressure in front of it, so I shall call the front (as shown in Fig. 1) the vacuum side of the propeller and shall designate the surfaces of the blades (shown in Fig. 1) as V. The rotating screw will simultaneously create a zone of high pressure on the back side, which I shall call the slip side, and designate as S.

The propeller has the usual boss section 1 containing the hub bore 5 in which the hub may be secured, and it comprises a plurality of blades 2. In this instance, I have shown two blades, as this is the commonest form of air propeller; but it is to be understood that I contemplate the adaptation of my invention to propellers having more than two blades, such as three or four blade propellers.

It is desirable to maintain the pressure on the vacuum side of the propeller as low as possible, and this can only be done by shaping the blades so as not only to create the vacuum at minimum power expenditure, but also to maintain it by preventing air on the high pressure or slip side of the propeller from slipping around the trailing edge of the blade or over the end of the tip, and thus tending to break the vacuum. I have carefully curved my blades to create and also maintain the maximum vacuum and obtain this result by convexly curving the area on the slip side of the blade from the boss section toward the tip, as shown at 3 in Figs. 2 and 3, and also convexly curving the area on the slip side along the trailing edge, as shown at 4 in Fig. 4. These curved areas blend smoothly into the surface of the blades and form a depression or "dished out" area on the vacuum side of the blade, which may be called a vacuum cup.

The increase of efficiency due to the use of the curved edge portions is probably due to the fact that little or no eddying or turbulence is caused at the edge of the blade to create a flow of air around the edge or tip and into the vacuum side, and thus distort or at least decrease the vacuum.

It is to be understood that the curve along the trailing edge, as illustrated in Fig. 4, may be decreased even to the extent of making a straight line surface on the vacuum side of the blade, if necessary, and still the longitudinal curve from the boss to the tip of the blade retained. The result is a slight loss in efficiency, but still an air screw which will give very good results.

The horizontal arrow in Fig. 4 indicates the direction of travel of the air foil section shown therein, while the propeller is rotated as described above and illustrated in Fig. 1, and the vertical arrow indicates the direction of the rectilinear motion of the propeller and aircraft to which it is attached when the aircraft is in flight under the action of the rotating blade.

While I have herein shown and described one embodiment of my invention, I wish it to be understood that I do not confine myself to all the precise details herein set forth by way of illustration, as modification and variation may be made without departing from the spirit of the invention or exceeding the scope of the appended claims.

What I claim is:

1. In a propeller, a blade possessing an edge portion along the tip and trailing edge thereof more acutely concaved on the vacuum side than the remainder of the blade area to form a maximum concavity adjacent to the tip and trailing edge with a substantially complemental convexly shaped slip face.

2. In a propeller, a blade possessing a marginal area extending along the trailing edge and around the adjacent tip portion reversely curved with respect to the remainder of the blade area and serving in conjunction therewith to form a cup-like depression on the vacuum side of the blade with a complemental convexity on the slip side thereof.

3. In a propeller, a blade comprising a convex slip side and a concave vacuum side, the concavity of said vacuum side being substantially complemental with the convexity of said slip side, and progressively increasing from the leading edge to a maximum at a point nearer to the trailing edge than to the leading edge, and decreasing again to said trailing edge to form a gradual and smooth curved area.

4. In a propeller, a blade comprising a convex slip side and a concave vacuum side, the concavity of said vacuum side being substantially complemental with the convexity of said slip side and progressively increasing across a transverse section of the blade from the leading edge to a maximum at a point nearer to the trailing edge than to the leading edge, and decreasing again to said trailing edge, and across a longitudinal section of said blade said concavity progressively increasing from the boss to a maximum at a point nearer to the tip than to the boss and decreasing again to said tip to form in conjunction with the transverse concavity a concave area having a maximum depth nearer to the trailing edge than to the leading edge and nearer to the tip than to the boss.

5. In a propeller, a blade comprising a convex slip side and a substantially complemental concave vacuum side, and having transverse sections throughout the working area of the blade, each disclosing a concavity on the vacuum side gradually increasing from the leading edge to a maximum between the leading edge and the trailing edge and from thence gradually decreasing again to the trailing edge to produce a smooth curve for said blade.

6. In a propeller, a blade comprising a convex slip side and a substantially complemental concave vacuum side, the curved area of said blade reaching its maximum departure from a cord connecting the leading and trailing edges at a point between the transverse mid-point of the blade and the trailing edge and between the longitudinal mid-point and the tip of the blade.

7. In a propeller, a blade comprising a convex slip side and a substantially complemental concave vacuum side, the curved area of said blade reaching its maximum departure from a cord connecting the leading and trailing edges at a point between the transverse mid-point of the blade and the trailing edge and between the longitudinal mid-point and the tip of the blade to afford smooth flow of air from the hub portion toward the tip portion when the propeller is in operation.

8. In a propeller, a blade comprising a convex slip side and a substantially complemental concave vacuum side, and having transverse sections throughout the working area of the blade, each disclosing a concavity on the vacuum side gradually increasing from the leading edge to a maximum between the leading edge and the trailing edge and from thence gradually decreasing again to the trailing edge to produce a smooth curve for said blade to afford smooth flow of air from the hub portion toward the tip portion when the propeller is in operation.

Signed at New York city, in the county of New York and State of New York this 26th day of June, A. D. 1929.

HORACE HULL.